United States Patent [19]

Plunkett

[11] Patent Number: 4,554,491
[45] Date of Patent: Nov. 19, 1985

[54] BRUSHLESS DC MOTOR HAVING A LAMINATED STATOR WITH A SINGLE STATOR WINDING

[75] Inventor: Larry E. Plunkett, Danville, Ill.
[73] Assignee: MSL Industries, Inc., Lincolnwood, Ill.
[21] Appl. No.: 639,331
[22] Filed: Aug. 10, 1984
[51] Int. Cl.[4] .................... H02P 6/02; F04B 35/04; F01P 7/02
[52] U.S. Cl. .................... 318/254; 310/68 R; 310/186; 310/62; 310/63
[58] Field of Search .................... 318/138, 254, 439; 310/68 R, 186, 187, 188, 62, 63

[56] References Cited

U.S. PATENT DOCUMENTS

| 1,701,362 | 2/1929 | Haddrell | 310/186 X |
| 4,030,005 | 6/1977 | Doemen | 318/439 X |
| 4,129,808 | 12/1978 | Bregeault et al. | 318/254 |
| 4,217,508 | 8/1980 | Uzuka | 310/46 |
| 4,376,261 | 3/1983 | Heide et al. | 318/138 X |
| 4,454,454 | 6/1984 | Valentine | 318/257 X |

FOREIGN PATENT DOCUMENTS

| 58-33961 | 2/1983 | Japan | 318/254 |
| 58-66568 | 4/1983 | Japan | 318/254 |
| 58-157359 | 9/1983 | Japan | 318/254 |

Primary Examiner—William M. Shoop, Jr.
Assistant Examiner—Bentsu Ro
Attorney, Agent, or Firm—Charles F. Pigott, Jr.

[57] ABSTRACT

A DC brushless motor is provided in which the stator has a central annular portion defining a central aperture, a plurality of winding core members which extend radially from the central annular portion and a plurality of intermediate core members which extend radially from the central annular portion and are positioned intermediate the winding core portions. A single stator winding extends around the winding core portions. The coils of the winding on adjacent winding core portions are wound in opposite directions electrically. A control circuit is provided for simultaneously exciting all of the winding coil portions and for electrically reversing the exciting current as a function of the rotational position of the rotor.

A Hall sensor is positioned intermediate a winding core portion and an intermediate core portion and is connected to the control circuit for detecting the rotational position of the rotor with respect to the stator. The control circuit is responsive to the rotational position of the rotor for selectively reversing the current passing through the windings. Thermal sensing means are provided for altering the operation of the control circuit to effect adjustment of the motor speed and to operate the fan at the minimum speed required to maintain desired temperatures, whereby noise generated by the fan is minimized.

14 Claims, 14 Drawing Figures

BRUSHLESS DC MOTOR HAVING A LAMINATED STATOR WITH A SINGLE STATOR WINDING

FIELD OF THE INVENTION

The present invention relates to DC brushless motors, and more particularly to DC brushless motors for use in fans and ventilation equipment.

BACKGROUND OF THE INVENTION

A variety of electrical, electronic and mechanical office equipment must of necessity incorporate suitable ventilators in order to prevent overheating. Such ventilation has been provided for years by small axial flow fans driven by small AC motors, such as shaded pole motors.

In spite of the necessity of their use, fans or ventilators are inconvenient to equipment designers because they make noise and take up space. They are widely used, however, because a wide variety of apparatus and equipment do not work properly without the proper ventilation.

In such environments, fans must meet a number of requirements. These include small size, low cost, minimal maintenance, long life and reliability. Because of these requirements, the smaller "miniature" fans have historically been driven by AC motors, mainly shaded pole types. One reason for this is that such motors meet many of these specifications, particularly low cost and reliability. There are certain conditions that preclude the use of AC fans, and these are specifications which such fan motors do not meet. For example, there are conditions and applications in which a ventilator or fan driven by a DC motor is required simply because AC power is not available. Where only low power is available, DC motors are used because they have low power input requirements. DC motors have an additional distinct and significant advantage over AC motors, namely, variable speed control. For long life, however, a brush-type DC fan motor would be unacceptable because the brushes would wear and require replacement.

It would therefore be highly desirable to provide a brushless motor which could provide the necessary power for driving a fan or ventilator and which would meet the above-stated requirements of small size, low cost, minimum or no maintenance, reliability and low noise.

As indicated above, one of the advantages of the DC motor is the fact that the speed of the motor and the fan driven thereby can be varied. Thus, for example, if the cooling load or requirements are reduced, it would be possible to reduce the speed of the motor thereby reducing the noise produced thereby. The noise of a fan is in part attributed to the speed of rotation as well as the design of the fan itself. For example, if a fan is designed to move sufficient air to provide the necessary cooling at lower speeds, the fan noise would be reduced. However, the power of DC motors is directly related to the input voltage and therefore the speed at which the motor is driven.

One of the deficiencies of DC motors, particularly small DC motors such as those for 3-inch and 4½ inch axial fans, is the inability to produce sufficient power to provide maximum variability and control capability for the fan to be functional at a variety of air load pressures so the fan can operate at varying speeds to minimize noise problems. The desirability of such DC brushless motors for fan application is well-known as evidenced by articles that have been addressed to the problem, such as an article entitled "Brushless DC Fans" by Ulrich Koletzki published in the Motorcon March 1982 Proceedings, pages 660–672; an article entitled "Brushless DC Air Movers Interface With the Design Engineer" by Fred A. Brown published in the Motorcon March 1982 Proceedings, pages 673–683; and a brochure published by the Panasonic Company entitled "Panaflow by Panasonic—DC Brushless Axial Flow Fan." While these materials discuss the desirability of DC brushless motors and some of the characteristics which such motors should have, the miniature type DC brushless motors for miniature fans have not fully achieved the desired goals which are set forth in the references enumerated above.

SUMMARY OF THE INVENTION

In accordance with the present invention, there is provided a DC brushless motor capable of providing at low input voltages sufficient output power to enable variable speed control needed for quieter fan operation.

In accordance with one embodiment of the present invention, there is provided a miniature DC motor incorporating bidirectional current excitation that is constructed efficiently and inexpensively by use of a single series winding. The motor incorporating the illustrative embodiment of the present invention provides significantly improved performance over existing motors, is capable of being manufactured and sold at prices competitive with AC shaded pole motors, and eliminates the need for a plurality of discrete components which cannot be incorporated in such small motors. By utilizing a bidirectional current control system, all of the poles can be energized simultaneously with the proper polarity current to produce increased torque for given input voltages (i.e., at a selected speed of rotation) than is presently available. With the greater torque produced, a fan driven by a motor incorporating the present invention is capable of maintaining its rotational speed against higher air pressures and therefore can deliver desired air flow against such higher air pressures. Alternatively, the increased torque produced by such a bidirectional current excitation motor permits the use of a higher loading fan configuration which may deliver more air at lower rotational speeds, thus providing increased air flow for a given speed and therefore at lower noise levels. Thus the motor incorporating the present invention is capable of driving a fan to provide air flow against increased loading at selected rotational speeds.

In accordance with the illustrative embodiment of the present invention, all the windings are energized simultaneously with the polarity of the energizing current being alternated as a function of the rotational position of the rotor. The single series connected winding on all of the stator poles provides an additional advantage by reducing the number of windings required, and by allowing the use of thicker wire, thus improving the efficiency of manufacture by reducing the problems that can result from manipulation of very thin wire. Since larger wire requires less turns and less turns are also possible because of the number of windings connected in series, manufacturing costs are reduced.

Thus a bidirectional current excitation control with a single winding connected in series over a plurality of stator poles provides savings in material, facilitates winding manufacture because of the larger wire, less winding, the continuous winding techniques permitted thereby, and a reduction in the number of terminates for external connection to the motor control circuit.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

DETAILED DESCRIPTION OF THE ILLUSTRATIVE EMBODIMENTS

Figure 1:
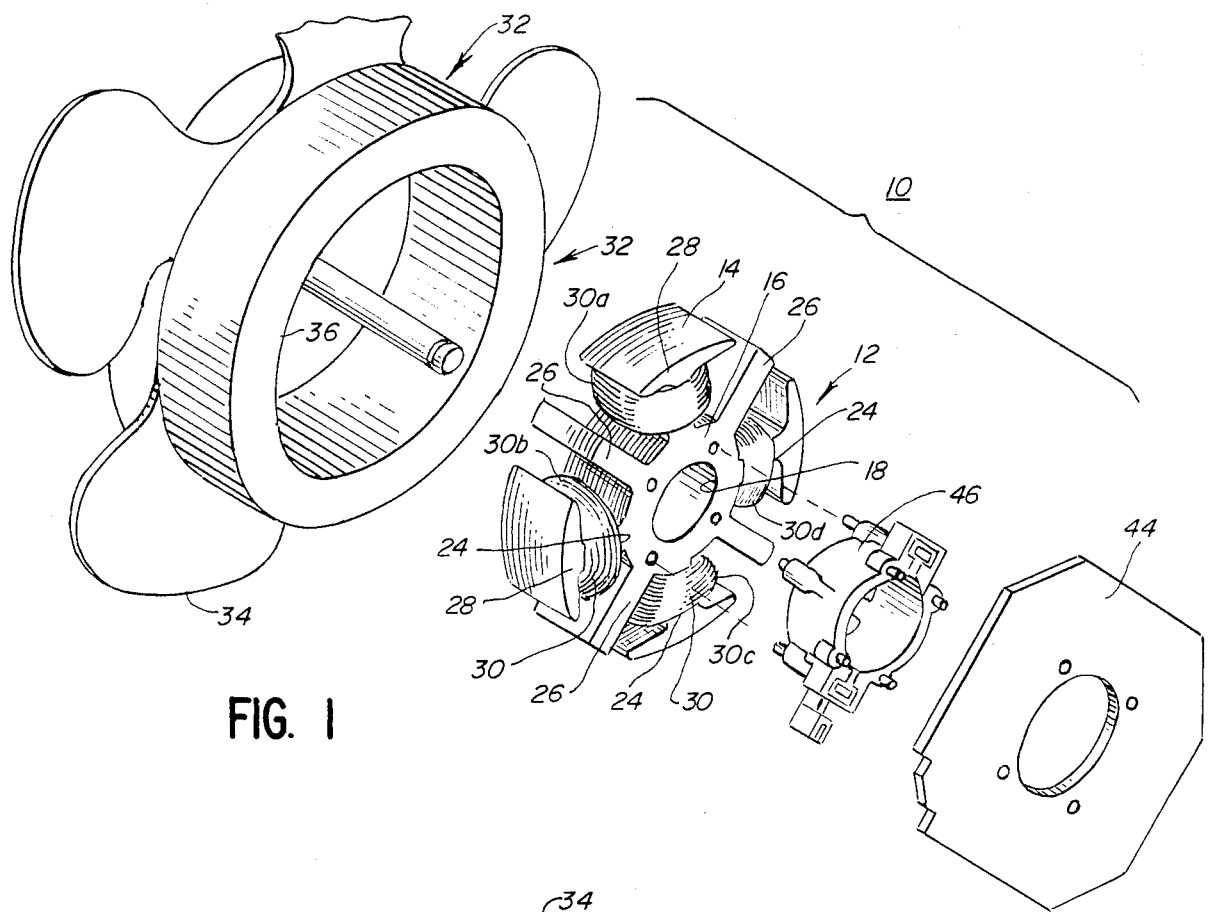
FIG. 1 is an exploded view of a brushless DC fan motor incorporating the present invention.
Figure 2:
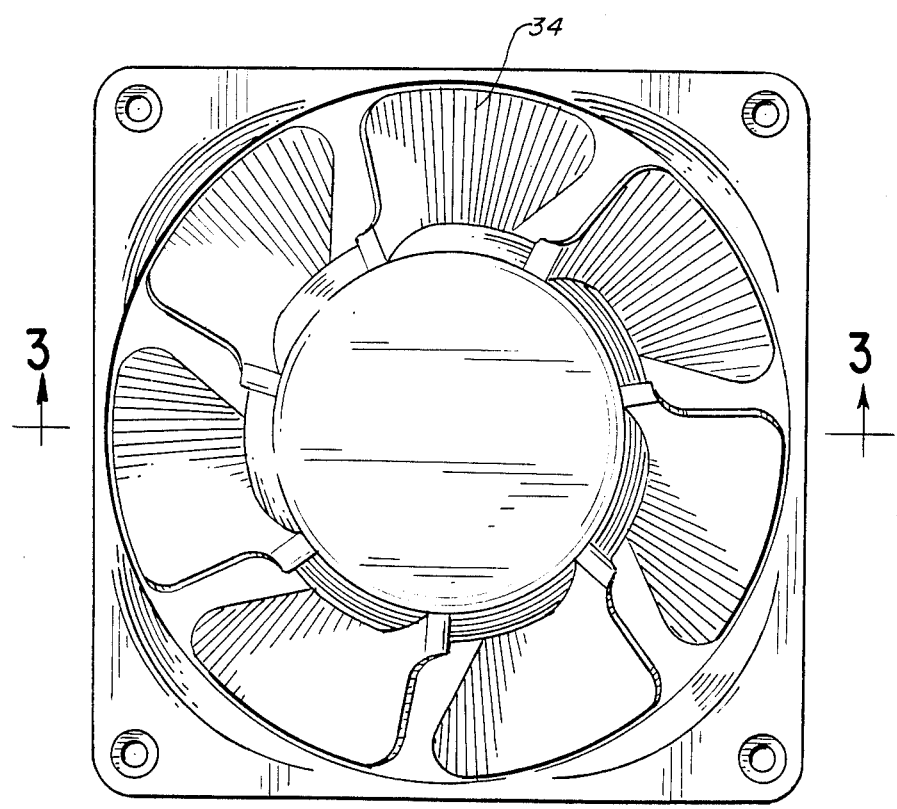
FIG. 2 is a front view of an axial type miniature box fan with which the motor incorporating the present invention is designed to be used.

While this invention is susceptible of embodiment in many different forms, there are shown in the drawings and will herein be described in detail preferred embodiments of the invention. It should be understood, however, that the present disclosure is to be considered as an exemplification of the principles of the invention and is not intended to limit the invention to the embodiments illustrated.

Figure 3:
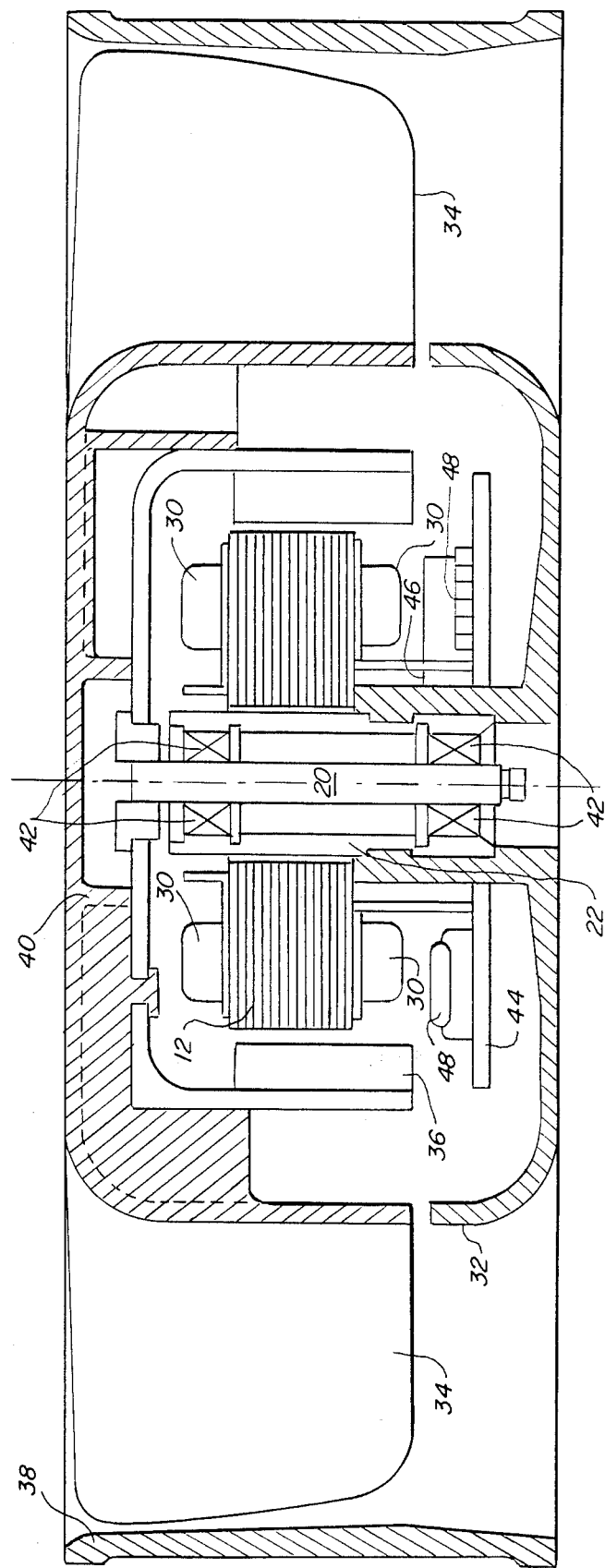
FIG. 3 is a sectional view taken along the plane of the line 3—3 of FIG. 2.
Figure 4:
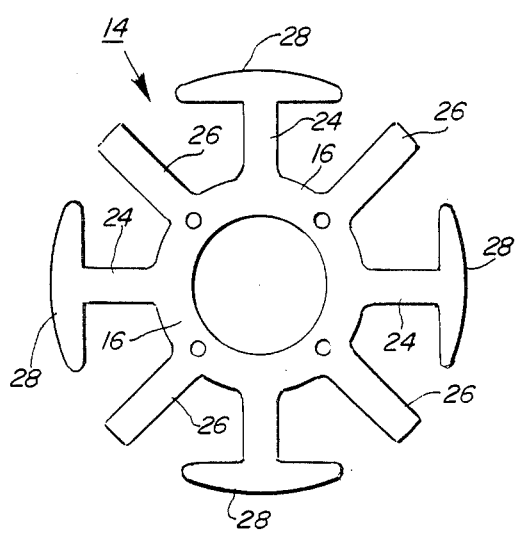
FIG. 4 is a front view of a stator lamination suitable for use in the motor incorporating the present invention.

Referring to FIGS. 1 and 3, the DC motor 10 incorporating the present invention utilizes a laminated stator 12 made up of a plurality of stator laminations 14 such as shown in FIG. 4. The configuration of each lamination is identical with the thickness of the stator being a function of the number of laminations.

Each stator lamination includes a central annular portion 16 defining a central aperture 18 through which pass a rotor shaft 20 and bearing housing 22. Extending radially outward from the annular center portion 16 are a plurality of radial core members 24, 26.

Core members 24 are provided with an oppositely extending circumferentially oriented head portion 28. A single stator winding 30 passes around each of the headed core members 24 with the direction of the winding coils (e.g., 30b and 30d) being in the opposite electrical direction. The winding 30 is a single series winding having only a pair of terminations at either end thereof.

The oppositely oriented winding coil pairs provide opposite magnetic fields to effect rotation of a rotor 32 when current is passed through the winding 30. As described below, the current through the winding 30 is reversed periodically as a function of the rotor position to effect the desired rotational movement of the rotor 32 and seven fan blades 34 affixed thereto.

The use of the single series wound winding 30 extending over the four headed poles 24 allows the use of less windings on each pole in order to exhibit the desired impedance, allows for the use of larger wire, and allows for the use of less terminations. Thus in a twelve-volt motor, for example, the same characteristics can be produced in accordance with the present invention by a single winding utilizing 150 turns of number 28 magnet wire on each pole as distinguished from a prior system in which each winding is separate and which typically require 300 turns of smaller No. 31 magnet wire on each pole.

This is possible because two coils in a half wave system exhibit less impedance than the four coils in series in accordance with the present invention. The use of larger wire with only half turns provides the same amount of copper for each winding but increases the cross-sectional area and thereby provides a better performance. In addition, the smaller number of windings increases the speed and efficiency at which the stator can be produced and the heavier wire makes the winding process all that easier.

The construction of the miniature axial motor incorporating the present invention is shown in greatest detail in FIG. 3. As shown, the rotor assembly 32 comprises a permanent annular magnet 36 disposed within an open-ended metallic shell 38 affixed to the fan hub 40 which may conveniently be made out of a plastic or other non-metallic material. The rotor shaft 20 is suitably affixed to the rotor 32 and extends through the central bore of the bearing housing 22 and is supported therein by appropriate bearings 42.

The stator 12 is disposed around the central bearing housing 22 and is supported on a circuit board 44 by appropriate spacer means 46 which also provides electrical connection between the stator winding and the circuit components 48 on the circuit board. Because of the construction of the stator in accordance with the present invention using a single series wound winding 30, only two terminations need be brought out from the stator 12 to the spacer 46 for connection to the circuit board 44.

Furthermore, because of the use of the higher impedance single winding, the amount of current required to produce the necessary magnetic field is less than is required with the use of separate windings and therefore the demagnetizing force produced is also reduced. Since the resistance to demagnetization is a function of the radial thickness of the permanent rotor magnet, and since the demagnetizing force produced by a motor constructed in accordance with the present invention is less, the weight of the rotor in a motor constructed in accordance with the present invention may be lowered by reducing the axial thickness of the permanent magnet 36.

Figure 5:
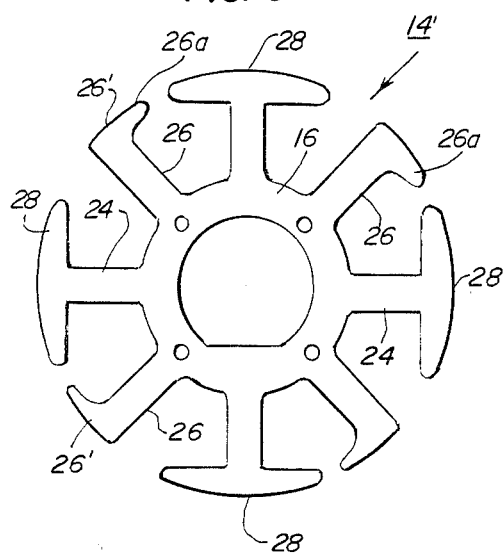
FIG. 5 is a front view of an alternative embodiment of a stator lamination suitable for use in the motor of the present invention.

Referring to FIG. 5, the stator may be constructed in a different configuration from the stator illustrated in FIG. 4. As illustrated in FIG. 5, pole members 26 are formed with offset head portions 26'. Offset head portions 26' each comprise an extra member 26a which extends in the direction opposite to the direction of rotation of rotor 32. Thus, with respect to the FIG. 5 embodiment, rotor 32 would be rotating in the counterclockwise direction. The purpose of offset head portions 26' is to ensure that when the motor is turned off, the rotor stops in a position that will allow the motor to restart, rather than end a null position. Except for offset head portions 26', lamination 14' illustrated in FIG. 5 is identical to lamination 14 illustrated in FIG. 4.

Figure 6:
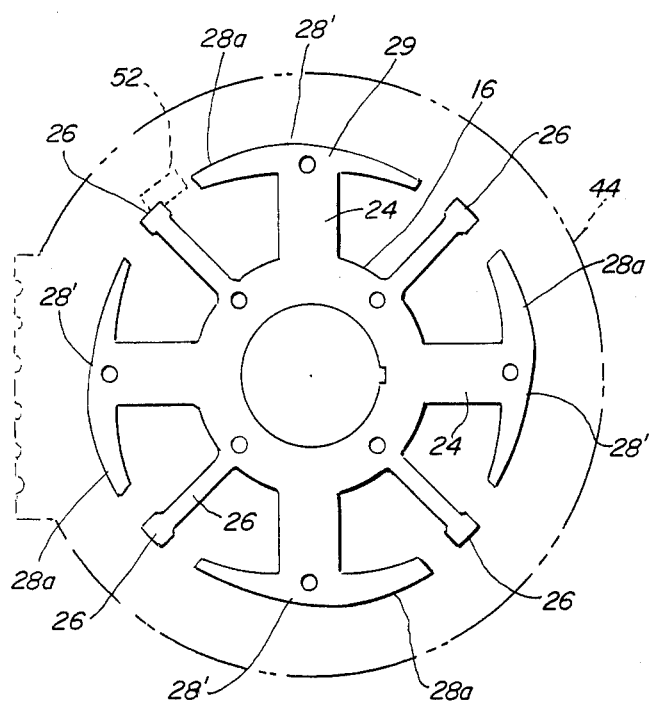
FIG. 6 is a front view of an alternative embodiment of a stator lamination suitable for use in the motor of the present invention.
Figure 7:
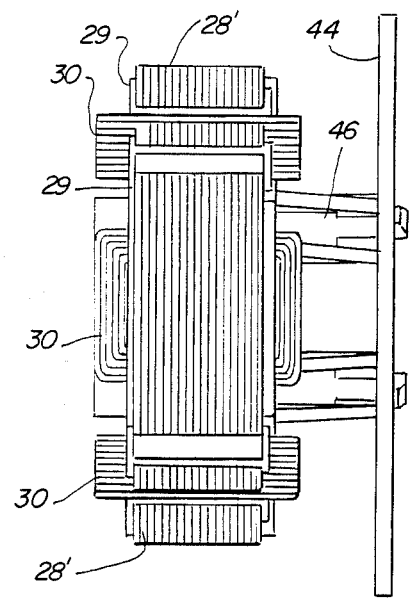
FIG. 7 is a right side elevation of a stator, spacer and circuit board constructed in accordance with the FIG. 6 embodiment.

Referring to FIGS. 6 and 7, an alternative stator construction is shown therein. Instead of the circumferentially oriented head portions 28 of core members 24 illustrated in FIGS. 4 and 5 wherein head portions 28 are perfectly arcuate as illustrated, head portions 28' in the FIGS. 6 and 7 embodiment are tapered downwardly in a direction that is opposite to the direction of the rotor rotation. This provides a variable reluctance air gap, thereby providing a non-symmetrical pole arrangement that achieves the purpose of the FIG. 5 configuration. Thus head portions 28' are eccentric, as illustrated in more detail in FIG. 13.

Figure 13:
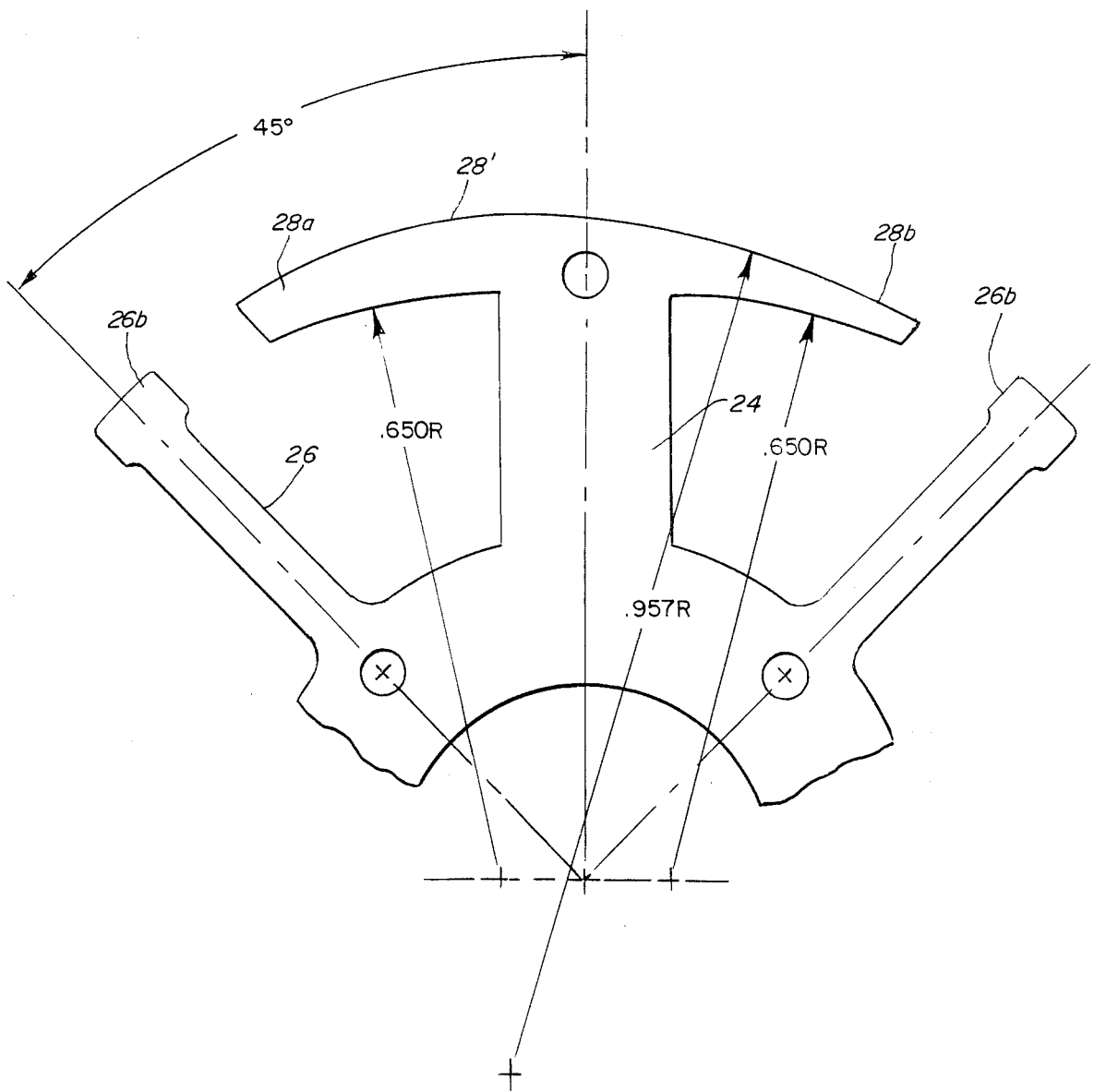
FIG. 13 is an enlarged view of a portion of the stator lamination of FIG. 6.

In FIG. 13, an enlarged view of a stator lamination is shown with dimensions being given. These dimensions are illustrative only and no limitation is intended with respect thereto. It can be seen that head portion 28' is eccentric, with it having a greater thickness at left portion 28a than at right portion 28b. There is an upward taper in the direction of rotation of the rotor which, in the FIG. 13 diagram, would be in the counterclockwise direction. It is also noted that intermediate core members 26 have enlarged heads 26b which, when combined with eccentric circumferential head portions 28' aid in ensuring that when the motor is turned off, the rotor will stop in a position that will allow the motor to restart, rather than in a null position. A plastic insulating member is preferably provided between winding 30 and the stator laminations.

Referring to FIG. 6, a Hall sensor 52 is located between inter-pole 26 and the high portion 28a of the circumferential head portion 28'. As discussed in more detail below, Hall sensor 52 senses the rotor relative to the stator at a point where the torque output is maximized and the rate of change of the current is minimal. Hall sensor 52 is a bipolar Hall effect digital latch. Although no limitation is intended, Hall sensor 52 may be a bipolar Hall effect digital latch Model No. UGN-3075 T/U or UGS-3075 T/U produced by Sprague Electric Company, 70 Pembroke Road, Concord, N.H. 03301. When the north pole is sensed, sensor 52 acts as an off switch and when the south pole is sensed, it turns on. It is a bistable device whereby it stays in its state until it is turned to the other state.

Figure 8:
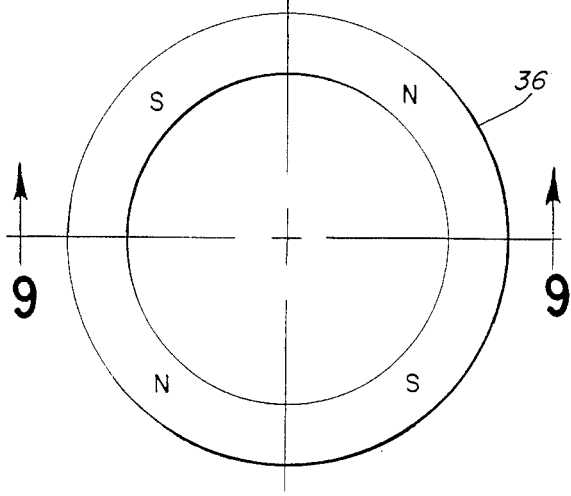
FIG. 8 is a diagrammatic view of a permanent magnet constructed in accordance with the principles of the present invention.
Figure 9:
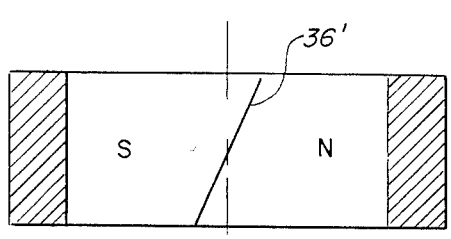
FIG. 9 is a cross-sectional view thereof, taken along the plane of line 9—9 of FIG. 8.

A schematic diagram of the motor magnet 36 is illustrated in FIGS. 8 and 9. Permanent magnet 36 is formed of four poles, as illustrated, with the poles being skewed as illustrated in FIG. 9. Thus it can be seen that the interface 36' between the south pole and the north pole is skewed. This skewing reduces the natural tendency of the permanent magnet poles to tend to align themselves with the stator poles. By skewing the interface, instead of having an immediate change of magnetic force there is a more tapered change of magnetic force, enabling the rotor to turn more smoothly.

Figure 10:
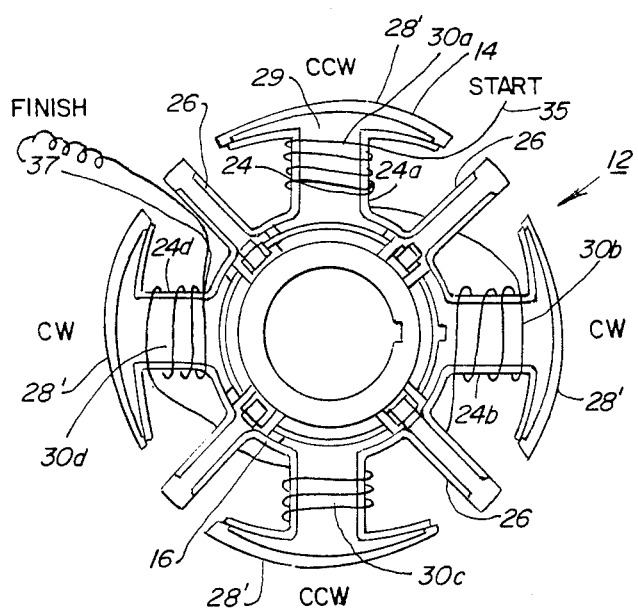
FIG. 10 is a rear elevational view of a stator and spacer constructed in accordance with an embodiment of the present invention.
Figure 11:
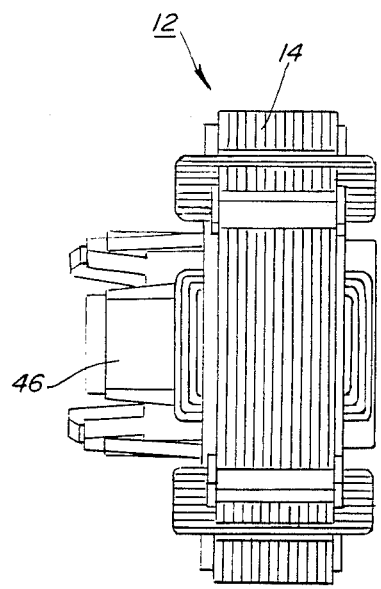
FIG. 11 is a right-hand elevation thereof.

In FIGS. 10 and 11, a stator is illustrated with the winding shown, in FIG. 10, in schematic form. The stator 12 of FIGS. 10 and 11 comprises a plurality of stator laminations 14, with each lamination including a central annular portion 16 and radially extending core members 24 and 26. A plastic insulative enclosure 29 encloses the lamination stack of and is interposed between the laminations and winding 30.

Figure 12:
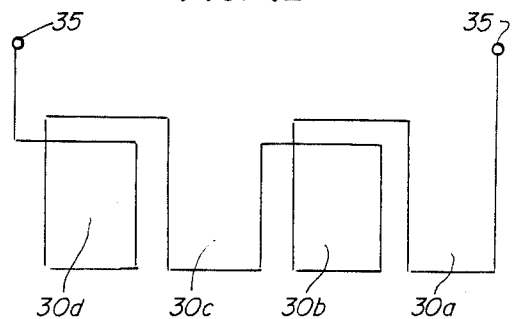
FIG. 12 is a schematic wiring diagram of the stator of FIG. 10.

Winding 30 is a single series winding which, as illustrated in FIG. 10, begins at point 35. Winding portion 30a is wound in the counterclockwise direction around core member 24a and it is then extended to core member 24b with winding portion 30b being wound in the clockwise direction. The winding is then extended to core member 24c where winding portion 30c is wound in the counterclockwise direction, and the winding is then extended to core portion 24d where winding portion 30d is wound in the clockwise direction. The end of the winding is at point 37. Points 35 and 37 are found on the circuit board 44, and the schematic diagram of this winding configuration is set forth in FIG. 12.

In order to utilize the full wave system in accordance with the present invention, it is necessary to reverse the polarity of the current passing through the windings as a function of the rotational position of the rotor 32 and the permanent magnet 36 carried thereby. To do this, a control circuit 50 (FIG. 14) is utilized to reverse the polarity of the current passing through the winding. A Hall sensor 52 triggers the control circuit to reverse the polarity of the current passing through the windings.

Figure 14:
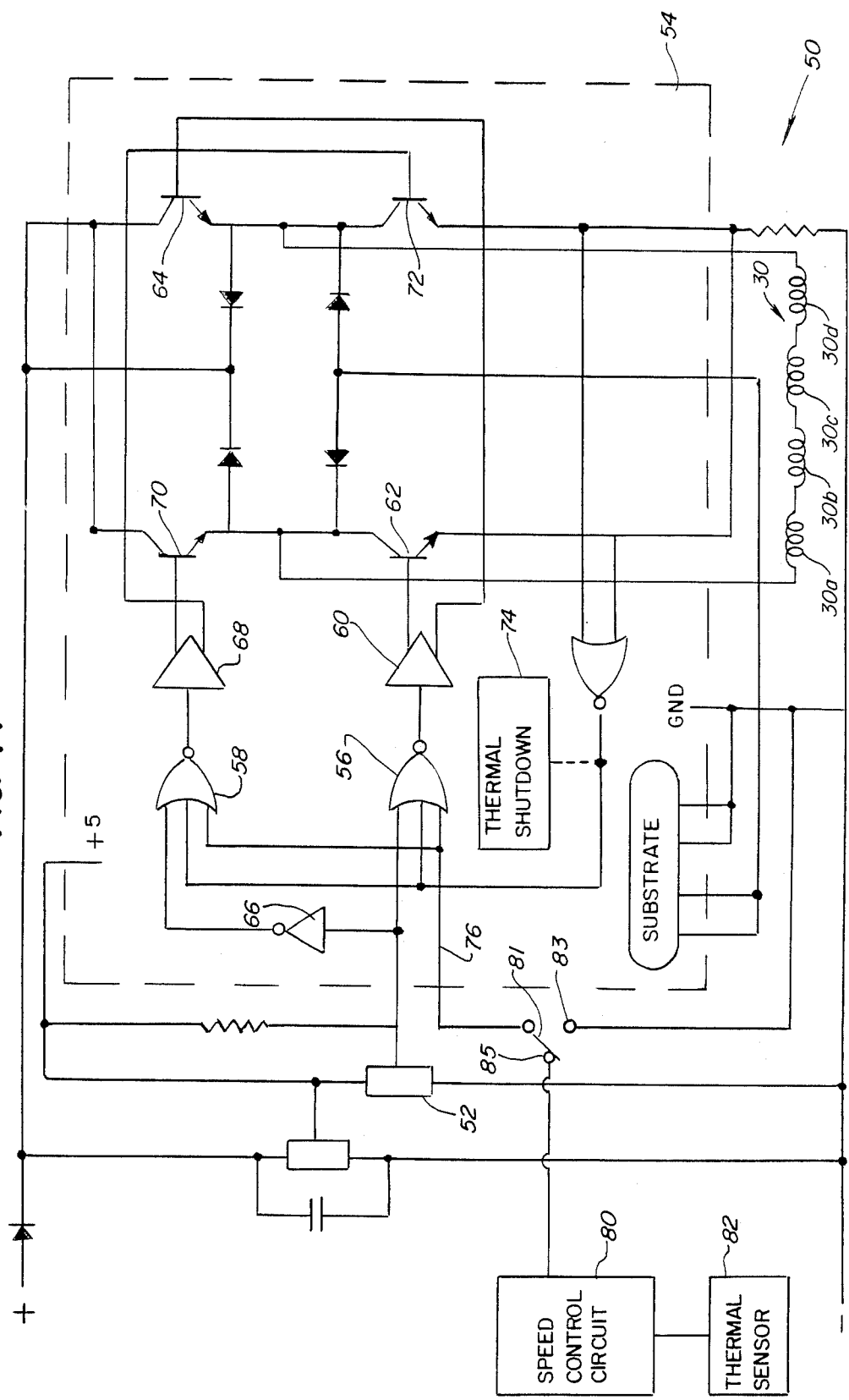
FIG. 14 is a circuit diagram showing the control circuit utilized in the motor incorporating the present invention.

As shown in FIG. 14, a control circuit utilized in accordance with the present invention includes an integrated circuit 54 such as a circuit identified by the numbers UDN-2952 produced by Sprague Electric Company of 115 Northeast Cutoff, Worcester, Mass. 01606.

The Hall sensor senses the relative rotational position of the permanent magnet and produces an alternating polarity output which is applied to the input gate 56 and to input gate 58 through inverter 66, all in circuit 54. As a result, the outputs of the gates 56, 58 are reversed and the current through the single stator winding 30 is also reversed. When the output of the Hall sensor 52 is a first polarity, a signal is applied through input gate 56 and amplifier 60 to the base of a pair of transistors 62, 64 which results in current passing through the stator winding 30 from right to left as shown in FIG. 14. When the polarity of the output of the Hall sensor 52 is reversed, the input signal to the other input gate 58 through inverter 66 provides an output through amplifier 68 to switch the other pair of transistors 70, 72 on to produce a current through the winding from left to right as shown in FIG. 14.

Suitable safety circuitry such as a thermal shutdown 74, formed as a part of integrated circuit 54, may be provided in the event that temperatures within the motor rise beyond safe limits such as might occur if power continues to be applied and the motor is stalled and rotation is not possible.

Another advantage of utilizing the circuit shown in FIG. 14 is that it provides an easy speed control for the motor. As shown in the drawing, a third input 76 to the input gates 56, 58 is grounded to permanently enable the gates to produce the alternate outputs through the motor winding 30. However, by connecting the third input 76 to an external control circuit 80, the motor speed can be controlled by pulsing the input 76.

To this end, a double-throw switch 81 is utilized wherein, in a position engaging contact 83 line 76 is connected to ground, but in the position engaging contact 85 line 76 is connected to speed control circuit 80.

Speed control circuit 80 provides a pulse-width modulated waveform; in other words, a rectangular waveform having a duty cycle which depends on the speed required. The waveform could also provide on/off control by simply providing either a high or low.

When the input 76 to the input gates 56, 58 is high, both outputs will be turned off and no current will be applied to the stator winding 30. When the input to the gates is low, the control circuit is enabled and current will be applied through the winding as described above. By controlling the polarity of the enable input, and by varying the duty cycle of the on and off pulses, the speed of the motor can be controlled. Thus, a suitable external thermal sensor 82 might be utilized which would reduce the speed of the motor when the temperature of the areas being ventilated is sufficiently low and would increase the speed of the motor and rotational speed of the fan when additional ventilation is required.

As can be seen from FIG. 3, the amount of space available for control circuitry in the motor incorporating the present invention is minimal. Therefore, the discrete components that had previously been required to effect a full wave brushless motor cannot be used in such environments. The use of the Sprague circuit which is designed for reversible stepping motors in the environment of a full wave control of a unidirectional DC fan motor permits the construction of a motor having the improved capabilities not previously available. Thus, for example, in one embodiment, the use of a full wave control circuit increased output power of identical motors by approximately 80 percent. Furthermore, if equal performance between full wave and half wave control was desired, about 30 percent less volume of copper could be used with resulting cost savings.

As can be appreciated from the above Figures, with the significantly increased power available, the bidirectional current excitation fan motor incorporating the present invention can be utilized to drive more efficient fan configuration capable of moving more air, and therefore larger loads, at lower speeds.

The ability to move more air because of the fan configuration of course requires higher power motors. The ability to move the necessary air to provide the desired ventilation at lower speeds results in lower noise. Furthermore, the use of the circuit incorporating the present invention provides desired external speed control to produce the necessary ventilation under a variety of conditions and does not require the motor to operate at all times at worst case condition.

Thus there has been disclosed a brushless DC fan drive motor suitable for use in miniature type fan axial fans such as the 3-inch and 4½ inch type box fans commonly found for ventilating electrical and electronic equipment.

The motor incorporating the present invention provides the desired variable speed control and power to operate at lower speeds and thus reduce noise levels, is capable of driving fans having higher loading factors and being more efficient ventilators, which fulfills all of the desired characteristics of fan motors, namely, low cost, efficiency, minimal maintenance and low noise potential.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A stator for a brushless DC motor having a rotor, said stator being formed of a plurality of stacked stator laminations, with each stator lamination comprising:
   a central annular portion defining a central aperture;
   a plurality of winding core members extending radially from said central annular portion:
   a plurality of intermediate core members extending radially from said central annular portion and positioned intermediate said winding core members;
   a single series connected stator winding defining a plurality of winding coil portions extending around each of the winding core members of each stator lamination with the winding coil portions on adjacent winding core members being wound in opposite directions electrically; and
   each of said winding core members having a circumferential head portion at its distal end, with the circumferential head portion being eccentric and non-symmetrical about the axis of the respective winding core member.

2. A stator as described in claim 1, in which each eccentric circumferential portion comprises a wider portion and a narrower portion, with the provision of the wider portion being after the narrower portion in the direction of rotation of the rotor.

3. A brushless DC motor of the type having a permanent magnet rotor surrounding the stator, comprising:
   a stator formed of a plurality of stator laminations and disposed internally of said rotor;
   each of said stator laminations comprising a central annular portion defining a central aperture, a plurality of winding core members extending radially from said central annular portion, and a plurality of intermediate core members extending radially from said central annular portion and positioned intermediate said winding core members;
   a single series connected stator winding defining a plurality of winding coil portions extending around each of the winding core members with the winding coil portions on adjacent winding core members being wound in opposite directions electrically;
   control circuit means for simultaneously exciting all of said windings coil portions and for electrically reversing the exciting current as a function of the rotational position of said rotor, said control circuit means being responsive to the rotational position of said rotor for selectively reversing the current passing through said winding; and
   sensing means connected to said control circuit for detecting the rotational position of said rotor with respect to said stator.

4. A motor as described in claim 3, in which said motor drives a ventilating fan; and including thermal sensing means responsive to thermal conditions in the environment being ventilated for altering the operation of said control circuit means to effect adjustment of said motor speed and operate said fan at the minimum speed required to maintain desired temperatures, whereby noise generated by said fan is minimized.

5. A motor as described in claim 3, in which each of said winding core portions includes a circumferentially extending head portion that is eccentric and non-symmetrical about the axis of the respective core portion; said sensing means comprising a Hall sensor bistable switch positioned adjacent the circumferential head portion and intermediate said circumferential head portion and an adjacent intermediate core portion.

6. A motor as described in claim 3, in which said permanent magnet rotor comprises a plurality of poles with the interfaces between the poles being skewed to obtain a more tapered change of magnetic force.

7. A motor as claimed in claim 3, wherein each of said intermediate core members includes an offset, non-symmetrical head portion.

8. A motor as claimed in claim 3, wherein each of said winding core members includes a circumferential extending head portion.

9. A motor as claimed in claim 8, wherein each of said circumferential extending head portion are eccentric and non-symmetrical about the axis of the respective winding core member.

10. A motor as claimed in claim 3, wherein said sensing means is a Hall sensor bistable switch.

11. A motor as claimed in claim 10, wherein said Hall sensor switch is positioned intermediate an intermediate core member and a winding core member.

12. A motor as claimed in claim 11, wherein the Hall sensor switch is positioned adjacent the circumferential head portion of the winding core member and intermediate said circumferential head portion and an adjacent intermediate core member.

13. A motor as claimed in claim 3, wherein said control circuit comprises a speed control circuit providing speed control by pulse-width modulation.

14. A motor as claimed in claim 3, further comprising safety circuitry including a thermal shutdown means for terminating operation of the motor in response to excessive temperatures.

* * * * *